United States Patent [19]

Waterman

[11] Patent Number: 4,899,726
[45] Date of Patent: Feb. 13, 1990

[54] FURNACE INDUCER OUTLET ELBOW

[75] Inventor: Timothy J. Waterman, Carmel, Ind.

[73] Assignee: Carrier Corporation, Syracuse, N.Y.

[21] Appl. No.: 242,922

[22] Filed: Sep. 12, 1988

[51] Int. Cl.$^4$ ............................................. F24H 3/00
[52] U.S. Cl. ............................. 126/110 R; 126/99 R; 126/104 A; 285/236; 138/109
[58] Field of Search ................. 126/110 R, 99 R, 203, 126/201, 80, 104 A; 138/DIG. 11, 103, 109, 118, 155, 177; 285/177, 420, 235, 236

[56] References Cited

U.S. PATENT DOCUMENTS

| | | | |
|---|---|---|---|
| 2,171,023 | 8/1939 | Buxton | 138/DIG. 11 |
| 2,824,575 | 2/1958 | Rosen | 138/109 X |
| 4,059,293 | 11/1977 | Sipler | 285/236 |
| 4,380,348 | 4/1983 | Swartz | 285/236 |
| 4,583,770 | 4/1986 | Kreku et al. | 285/177 |
| 4,603,680 | 8/1986 | Dempsey et al. | |
| 4,653,466 | 3/1987 | DeHaan et al. | 126/110 R |
| 4,763,695 | 8/1988 | Dooley | 138/109 |

*Primary Examiner*—Larry Jones
*Attorney, Agent, or Firm*—Dana F. Bigelow

[57] ABSTRACT

The elbow between the discharge end of the draft inducer and a horizontal vent pipe is provided with a well structure on the lower side of its discharge end such that condensate forming in the vent pipe is prevented from passing through the elbow into the draft inducer housing. The well structure, in addition to restraining the flow of the condensate, provides for the draining off thereof, and presents a minimal restriction to the flow of flue gases flowing to the elbow. Provision is also made for maintaining a tight seal between a rectangularly shaped inlet lip of the elbow and a rectangularly shaped discharge end of the inducer housing by making the inlet lip of varying thicknesses, with the lip being thinnest at its corners and thickest at its side midpoints.

14 Claims, 2 Drawing Sheets

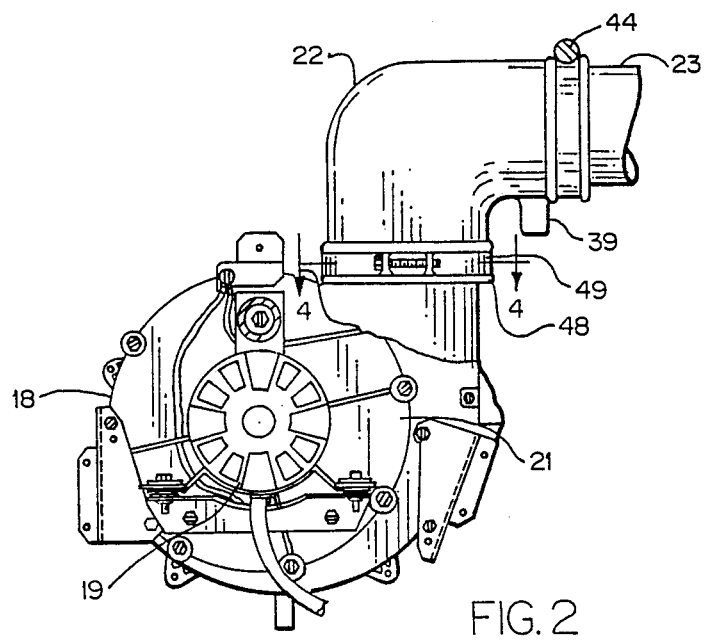
FIG. 2
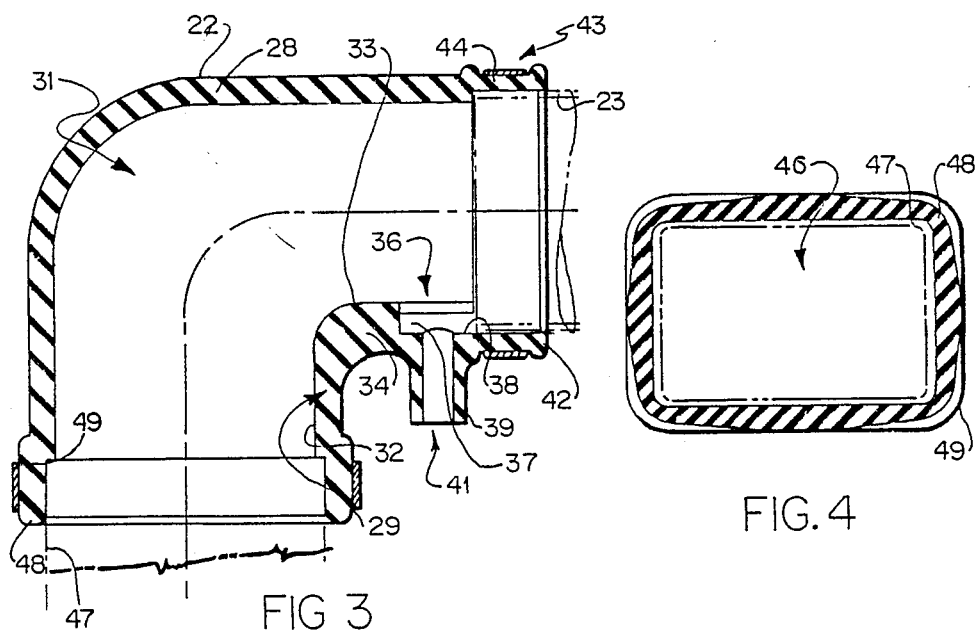
FIG. 3
FIG. 4

FURNACE INDUCER OUTLET ELBOW

BACKGROUND OF THE INVENTION

This invention relates generally to induced draft furnaces and, more particularly, to a transition member for interconnecting an inducer housing discharge opening to a vent pipe for a condensing furnace.

In induced draft furnaces, a motor driven inducer blower is provided to enhance the mixing of combustion air with the fuel in order to better facilitate the combustion process. While the inducer may be located upstream and be of the blow-through type, it is more common to place it downstream of the combustion process so as to draw the supply air into the burner and cause the combustion gases to flow through the heat exchangers and the vent pipe to be discharged outside. With non-condensing type furnaces, the discharge air to the vent pipe is normally at a sufficiently high temperature that condensation does not occur within the vent pipe. However, with a condensing furnace, the temperature of the discharge gas in the vent pipe is sufficiently low that condensation is likely to occur. If such condensation runs back into the inducer, damage may occur.

One method of dealing with the condensate which forms in the vent pipe is shown in U.S. Pat. No. 4,603,680 issued on Aug. 5, 1986 and assigned to assignee of the present invention. The approach there is to include a trough structure that tends to collect the condensate running down from the vent pipe and then carry it away by way of a drain pipe. It has been recognized, however, that such an approach is not entirely satisfactory in that the condensate run-off from the vent pipe can be excessive enough that it overshoots the trough and enters the inducer device. Further, the problem is exacerbated by the recognition that any structure which is placed in the area between the vent pipe and the inducer must not interfere with or create undue turbulence in the flow of combustion gases therethrough.

Condensing furnace vent pipes are normally installed so as to come out the side of the furnace. For ease of installation, it may be easier to place the vent pipe through the top of the furnace; however, it is preferred that the top of the furnace be relatively unobscured by such piping to leave space for the filters or air cleaner assembly. Since the particular furnace installation requirements will vary with respect to the desirability for left or right side discharge, provision is normally made for installation in either direction by the serviceman in the field. This is commonly accomplished by the use of some type of transition device such as an inducer outlet box or assembly which is used to turn the flow of the discharge air from its upward path exiting the inducer housing, to a substantially horizontal flow to the vent pipe in either the left or right side. In order to ensure proper installation, it is desirable that such a structure be simple to install and not likely to result in leakage or undue turbulence. Further, in order to accommodate maintenance and repair services, it is desirable to provide for easy disassembly and reassembly of the device. For example, in downflow furnaces where the circulation blower is mounted near the top of the furnace, it has been found necessary to remove the inducer outlet assembly in order to gain access to the circulation blower assembly. The disassembly and reassembly process must therefore be relatively easy to accomplish.

In order to facilitate the simple and easy attachment of the inducer outlet assembly between the inducer and the vent pipe, it has been found that a single piece elbow is preferred. Attachment can be facilitated by the attachment of overlapping portions of the outlet assembly around corresponding overlapped portions of the respective inducer discharge end and the vent pipe. The connections can be secured, for example, by a simple hose clamp. In the case of the vent pipe, this can be easily accomplished since the vent pipe is commonly round, and therefore the round inducer outlet assembly can be easily clamped thereover with equal distribution of forces around the periphery. At the inducer discharge end, however, a problem was encountered because of the rectangular shape of the inducer discharge opening. The mating portion of the inducer outlet assembly could easily be made to fit the rectangular shape; however, a rectangular clamp tended to exert a relatively high pressure at the corners but insufficient pressure at the flat surfaces intermediate the corners, thereby allowing leakage.

It is therefore an object of the present invention to provide an improved inducer outlet assembly for accommodating the side discharge of exhaust gases.

Another object of the present invention is the provision for an inducer outlet assembly which prevents the flow of condensate from the vent pipe to the inducer housing.

Yet another object of the present invention is the provision for an inducer outlet assembly which offers a minimum restriction to the flow of exhaust gases therethrough.

Still another object of the present invention is the provision for an inducer outlet assembly which can be attached to a rectangular inducer discharge opening without attendant leakage.

Another object of the present invention is the provision for securing a rectangular inducer outlet assembly to a rectangular inducer discharge opening in such a manner that leakage does not occur therebetween.

Yet another object of the present invention is the provision for an inducer outlet assembly which is easy to assemble and disassemble.

Still another object of the present invention is the provision for an inducer outlet assembly which is easy to manufacture and effective in use.

These objects and other features and advantages become more readily apparent upon reference to the following description when taken in conjunction with the appended drawings.

SUMMARY OF THE INVENTION

Briefly, in accordance with one aspect of the invention, an inducer outlet assembly, for attachment between a furnace flue gas draft inducer outlet and a vent pipe, is provided with a well portion near the end which attaches to the vent pipe. The well portion includes a bottom wall with a condensate drainage opening therein, and an adjoining vertical wall which rises to a vertical height which is substantially higher than the attached vent pipe lower wall such that any condensate that tends to flow down the vent pipe toward the inducer will tend to be restricted by the vertical wall and be collected by the well so it can be drained off by the condensate drainage opening.

By another aspect of the invention, the inducer outlet assembly is provided with a smooth rounded corner from the top of said well vertical wall to a vertical section of the inducer outlet assembly which connects to the inducer housing. The rounded corner provides for minimal flow restriction as the exhaust gases turn the corner in their flow from the inducer housing to the vent pipe.

By yet another aspect of the invention, an air tight connection is made between a rectangular overlapping portion of the flexible inducer outlet assembly and an overlapped rectangular portion of the inducer housing by forming a crown intermediate each of the inducer assembly rectangular sides. When a clamp is subsequently tightened around such inducer assembly overlapping portion, the clamp tends to exert a pressure on such crowns that is substantially equal to the pressure exerting at the corners of the rectangular portion to thereby result in an air tight seal between the overlapping and overlapped portions of the respective inducer outlet assembly and inducer housing.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 2 is an enlarged view of the inducer and inducer outlet elbow portion thereof.

FIG. 3 is a longitudinal sectional view of the inducer outlet elbow portion thereof.

FIG. 4 is a sectional view of the installed inducer outlet elbow as seen along lines 4—4 in FIG. 2.

BRIEF DESCRIPTION OF THE PREFERRED EMBODIMENT

Figure 1:
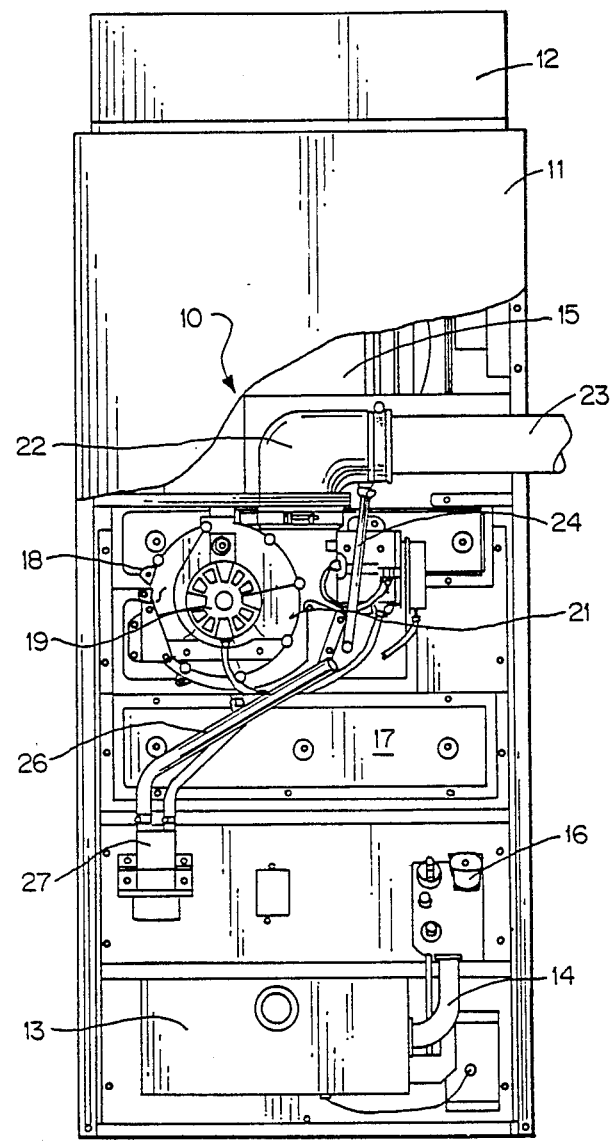
FIG. 1 is a partially broken away front elevational view of a furnace in accordance with the present invention.

Referring now to FIG. 1, the invention is shown generally at 10 as applied to a downflow furnace 11 wherein the circulating air flows downwardly over the heat exchanger(s) and the combustion gases flow upwardly through the heat exchanger(s) (not shown).

The air cleaner assembly 12 is shown at the top of the furnace.

A burner assembly 13 has a manifold 14 leading to a plurality of spaced burners into which gas is supplied by way of a gas valve 16. The combustion gases rise from the burners and flow through a primary heat exchanger (not shown) to an intermediate chamber 17. The combustion gases then flow through a condensing heat exchanger (not shown), where further heat is removed therefrom, and then to a draft inducer 18. The inducer 18, which is driven by a motor 19, operates in a conventional manner to draw air into the combustion burners and through the primary and condensing heat exchangers, and finally to the inducer housing assembly 21 where it is discharged by way of an inducer housing discharge elbow 22 to a vent pipe 23. At that point, the flue gases have been substantially cooled and are likely to be below the vapor dew point, in which case condensation will occur. If the condensate is allowed to enter the inducer housing assembly 21, damage may occur to the inducer. Accordingly, it is necessary to capture and dispose of the condensate before it reaches the inducer housing assembly. This is accomplished in accordance with the present invention by providing appropriate structure within the discharge elbow 22 for collection and disposal of the condensate. The condensate is first collected in a structure to be described hereinafter, and then it is drained by way of a vent drain tube 24 and condensate drain tube 26 to a condensate trap assembly 27 from which it is then drained to an appropriate location such as to the outside.

Referring now to FIGS. 2, 3, and 4, the inducer housing discharge elbow 22, with its condensate collection structure and the related devices for interconnecting it between the inducer housing assembly 21 and the vent pipe 23, is shown in greater detail. The elbow 22 can be oriented in either direction to thereby accommodate the individual installation requirements. That is, although it is shown installed in such a position as to discharge from the right side of the furnace as shown in FIG. 1, it may just as well be turned 180° such that it accommodates a vent pipe emerging from the left side of the furnace.

The elbow 22 is shown to include a large radius side 28 and a small radius side 29, with both having smooth curving surfaces to permit the relatively unrestricted flow of exhaust gases through the channel 31 formed therebetween. The small radius side 29 of the elbow 22 is comprised of the integrally connected straight upwardly extending section 32, a curved section 33, and a straight horizontally extending section 34. At the end of the horizontally extending section 34, there is formed a well structure 36 which is defined on two sides by side and bottom walls 37 and 38, respectively. The well 36 functions to prevent the flow of condensate into the inducer housing assembly 21 in a manner to be described hereinafter.

Depending from the well bottom wall 38 is a condensate discharge drain 39 with its associated opening 41. The vent drain tube 24 is connected to the condensate discharge drain 39 as shown in FIG. 1. Extending out from the bottom wall 38, and from the entire circumference of the discharge end of the elbow 22, is a discharge lip 42 with a circumferential depression 43 formed therein. To interconnect the elbow 22 to the vent pipe 23, the vent pipe is inserted into the inner diameter of the discharge lip 42 and a suitable clamp 44, such as a hose clamp or the like, is secured in the depression 43 as shown in FIGS. 2 and 3. As will be seen in FIG. 3, the inner diameter of the vent pipe 23 is only slightly above the well bottom wall 38, with the well side wall 37 extending vertically thereabove a substantial distance. Thus, when condensate forms in the vent tube 23 and runs into the elbow 22, it runs into the well 36 and is restricted from further flow by the well side wall 37 until it is able to be drained away by way of the discharge drain 39. This is true even when a substantial stream of water flows into the elbow 22 as may occasionally occur. This is accomplished without structure that obstructs the free flow of condensate gases through the elbow 22. Thus, while the well vertical wall 37 presents a barrier to any flow of condensate through the elbow 22, the vertical wall 37 and the associated horizontally extending section 34 and the curved section 33 of the elbow 22 are maintained in forms and positions such that the restriction to flow of the flue gases is minimized.

Referring now to FIGS. 3 and 4, it will be seen that the flue gas discharge opening 46 in the inducer housing assembly 21 is defined by a rectangular structure 47. Such a rectangular structure is more easily formed than would be a round structure at the discharge end of the inducer housing assembly 21. Further, when using an outlet box assembly as set forth in U.S. Pat. No. 4,603,680 mentioned hereinabove, a rectangular discharge opening is easily adaptable to such an assembly. Further, even when using an elbow as described in the present invention, it is relatively simple to provide a rectangularly shaped inlet lip 48 which then transitions to the round shaped cross section for the remaining portion of the elbow 22. However, it was recognized by the applicant that, when placing a rectangularly shaped inlet lip 48 around the rectangularly shaped structure 47 for attachment by a suitable clamp 49 such as a hose clamp, the clamp 49 tended to maintain a tight, leakproof seal at the corners of the inlet lip 48 but not at the spaces therebetween, especially near the midpoint of the sides. The present invention addresses this problem by making the inlet lip of variable thickness as shown in FIG. 4. As will be seen, the inlet lip 48 is of minimum thickness at its corners and of increasing thickness toward the midpoint of its sides. When the clamp 49 is then attached, the side midpoints, which were otherwise subject to inadequate sealing, are tightly clamped around the rectangular structure 47 because of their increased thicknesses, thereby ensuring a tight seal around the entire periphery of the rectangular structure 47.

While the present invention has been described with particular reference to a preferred embodiment, the concepts of the invention are readily adaptable to other embodiments, and those skilled in the art may vary the structure thereof without departing from the true spirit of the present invention.

What is claimed is:

1. In an inducer outlet assembly for conducting the flow of exhaust gases from the outlet of a furnace draft inducer to a vent pipe which is susceptible to the formation of condensation therein, an improved dam structure for preventing the flow of condensate from the vent pipe into the draft inducer comprising:
   an L-shaped section, with vertical and horizontal portions being attachable to the draft inducer and the vent pipe, respectively;
   an internally raised dam structure formed on a lower wall of said horizontal portion, near the end thereof which connects to said vent portion, said raised dam structure having a smooth rounded surface to facilitate the flow of exhaust gases thereover as they move from the vertical to the horizontal portions; and
   a well structure located in said horizontal portion between said raised dam structure and the end which is attachable to the vent pipe, said well structure including a side wall which extends upwardly to a height which is substantially higher than a lower wall of the vent pipe to define one end of said raised dam structure and to function to prevent the flow of condensate over said raised dam structure, and a bottom wall including an outlet opening for draining off condensate that flows into said well structure.

2. The improved dam structure as set forth in claim 1 wherein said well bottom wall is disposed at substantially the same vertical height as said vent pipe lower wall.

3. An improved dam structure as set forth in claim 1 wherein said inducer outlet assembly is composed of an elastomeric material.

4. An improved dam structure as set forth in claim 1 wherein said inducer outlet element is connected directly to the vent pipe in an overlapping relationship.

5. An improved dam structure as set forth in claim 1 wherein said inducer outlet assembly is connected directly to a rectangular opening of the draft inducer.

6. An improved transition element of the tubular type for interconnecting a vertically extending inducer housing and a horizontally extending vent pipe of a furnace comprising:
   an L-shaped tube having inlet and outlet ends;
   means for connecting said inlet and outlet ends to the inducer housing and the vent pipe, respectively;
   a well structure located in a section of said L-shaped tube, said well structure having a bottom wall with a condensate drain opening leading therefrom; and
   a side wall connected to said bottom wall and extending upwardly to a vertical height substantially higher than a bottom wall of the vent pipe to prevent the flow of condensate from the vent pipe to the inducer housing and to divert said flow to said well bottom wall for drainage through said drain opening.

7. An improved transition element as set forth in claim 6 and including a smooth rounded corner extending from the top of said wall side wall to a vertical section of said L-shaped tube to facilitate the smooth non-turbulent flow of exhaust gas through said L-shaped tube.

8. An improved transition element as set forth in claim 6 wherein said well bottom wall is at substantially the same vertical height as said vent pipe bottom wall.

9. An improved transition element as set forth in claim 6 wherein said L-shaped tube section containing said well structure is connected directly to said vent pipe in overlapping relationship therewith.

10. An inducer outlet assembly for conducting the flow of exhaust gases from the rectangular discharge opening of a furnace inducer housing to a vent pipe comprising:
    a tube having inlet and outlet ends for connection to the inducer housing discharge opening and the vent pipe, respectively;
    said tube having near its inlet end, a rectangular shaped sleeve portion for sliding over, in a relatively tight fitting, overlapping relationship, an overlapped portion of the inducer housing rectangular discharge end; and
    said sleeve portion having a greater thickness toward the mid-points of the rectangular sides thereof such that when a band is placed tightly around said sleeve portion, a proper sealing relationship is established between said sleeve portion and said overlapped inducer housing rectangular discharge end.

11. An inducer outlet structure as set forth in claim 10 wherein said tube is composed of an elastomeric material.

12. An inducer outlet structure as set forth in claim 11 wherein said tube is made of a neoprene material.

13. An inducer outlet assembly as set forth in claim 10 wherein said band is substantially rectangular in form.

14. In a furnace of the type having an inducer outlet assembly for conducting the flow of exhaust gas from a rectangular shaped discharge end of a furnace inducer housing to a vent tube, a method of attaching the inducer outlet assembly to said rectangular discharge end comprising the steps of:
    providing an inducer outlet assembly with a rectangular inlet end sized so as to be placeable in an overlapping relationship with the rectangular shaped discharge end, said inducer outlet assembly being further provided, at that portion which is to be placed in overlapping relationship with the rectangular discharge end, with a crown proximate the midpoint of each of its rectangular sides, the crown tending to render said rectangular sides thicker t their respective midpoints;

placing said inducer outlet assembly in overlapping relationship with said rectangular discharge end; and placing a band around said inducer outlet assembly overlapping portion and reducing its length to thereby secure said inducer outlet assembly to said rectangular discharge end in an airtight relationship, with said crowns acting to maintain such relationship along said rectangular sides.

* * * * *